Jan. 16, 1940.  T. McG. AIKEN  2,187,409

APPARATUS FOR TESTING PHOTOFLASH MECHANISM

Filed May 2, 1938

INVENTOR.
Thomas McG. Aiken,
BY Archworth Martin,
ATTORNEY.

Patented Jan. 16, 1940

2,187,409

UNITED STATES PATENT OFFICE 2,187,409

APPARATUS FOR TESTING PHOTOFLASH MECHANISM

Thomas McG. Aiken, Pittsburgh, Pa.

Application May 2, 1938, Serial No. 205,489

2 Claims. (Cl. 73—51)

My invention relates to apparatus for use in connection with flash lamp photography, and more particularly to the testing of synchronizing apparatus.

In the setting of synchronizers for camera shutters difficulty is frequently experienced in arriving at an adjustment whereby the peak of lamp illumination will occur at the instant the shutter is in its widest open position. Furthermore, such testing operations are expensive, because frequently a number of lamps have to be used up in order to arrive at the correct setting.

This invention has for an object the provision of means whereby the testing for synchronization can accurately and economically be effected.

Another object of my invention is to provide means which may be employed in connection with the various commercial synchronizers, without requiring any additional apparatus and without the necessity of using flash lamp bulbs in order to make tests.

Figure 1:
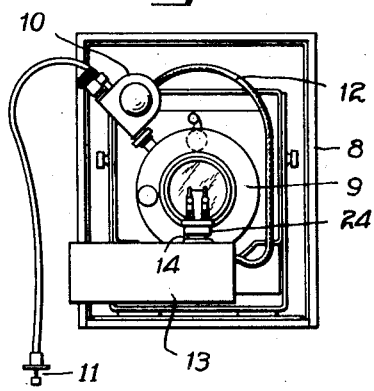
Figure 2:
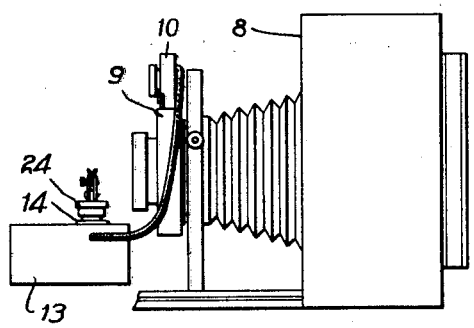
Figure 3:
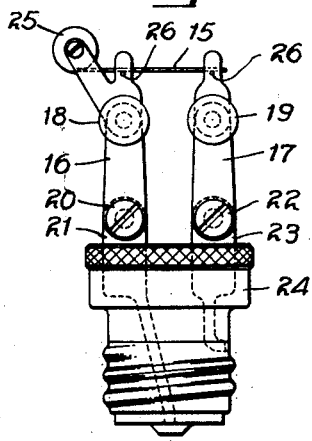
Figure 4:
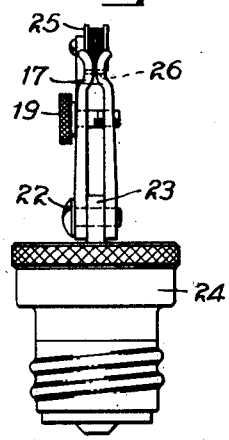
Figure 5:
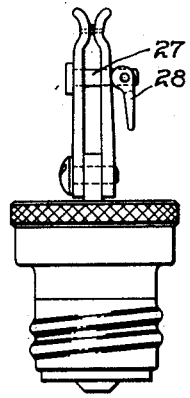
Figure 7:
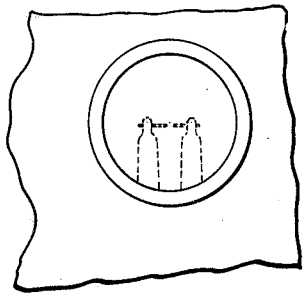
Figure 6:
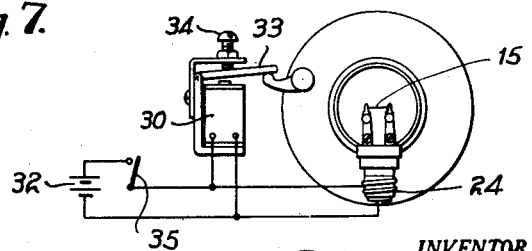

Some of the forms which my invention may take are shown in the accompanying drawing wherein Figure 1 is a face view showing the apparatus employed with one commercial type of synchronizer; Fig. 2 is a side view thereof; Fig. 3 is an enlarged view of a portion of the apparatus of Fig. 1; Fig. 4 is a side view thereof; Fig. 5 is a modification of the structure of Fig. 4; Fig. 6 is a partially diagrammatic view showing the invention as employed in connection with another type of synchronizing apparatus, and Fig. 7 is a schematic view indicating the appearance of one of the testing elements as viewed through the shutter when the apparatus has been adjusted to synchronization.

Referring first to Figs. 1 to 4, the camera 8 may be of any well-known form and is provided with a shutter casing 9 which may be of any standard form. Mounted on the camera is a synchronizing apparatus that may be of the type such as shown in Patent 1,996,592 of April 2, 1935, for example. This synchronizer when operated by a cable release 11 will move to close the circuit through a flash lamp and to trip the shutter. The timing as between the closing of the lamp circuit and the tripping of the shutter determines the accuracy of synchronization. In other words, the parts are so set that the flash lamp should be at its highest peak of illumination at the instant the shutter is in its widest open position. In testing for synchronization, the operator frequently has to use a number of bulbs, at considerable cost.

As shown on the accompanying drawing, the lamp circuit is a simple series circuit and would ordinarily include two wires within a cable 12 which leads to a battery casing 13, one of the wires being connected to one terminal of a battery contained in the casing and the other wire being connected to a socket 14 which is provided for receiving a photoflash lamp. The wires at their other ends are connected to contact members which are closed through operation of the cable release 11 and movement of the shutter-tripping element. The socket 14 of course is connected to the other side of the battery. Ordinarily when the apparatus is employed for the taking of a picture, a photoflash lamp is inserted into the socket 14 and the battery casing 13 held at the side of the camera to effect general illumination of the scene, whereupon the cable release 11 is actuated to effect energization of the lamp and operation of the shutter.

In order to test the operating mechanism, I provide a luminescent fuse member 15 which may be a copper wire of .003 inch in diameter, or other metal such as aluminum, iron etc., which will become luminescent upon application of rupturing current thereto. The battery 13 may be of the voltage usually employed in connection with flash lamps. The wire is releasably supported in jaws 16 and 17 that are clamped together by screws 18 and 19 respectively. The lower ends of the jaws 16 are pivotally connected at 20 to a terminal element 21, and the jaws 17 are pivotally connected at 22 to a terminal element 23. The terminal elements are carried by a screw plug 24 adapted to be inserted into the socket 14. The terminal elements 21 and 23 have electrical connection with the respective terminals of the screw plug 24, so that when the screw plug 24 is inserted into the socket 14, the wire 15 will be electrically connected in series with the battery and synchronizer switch.

When it is desired to test for synchronization, the battery 13 is held or suitably supported in the position shown in Figs. 1 and 2, so that the fuse wire 15 will be directly in front of the center of shutter opening. The operator will then look into the camera and operate the cable release 11 which, as above stated, will close the circuit through the fuse and shortly thereafter trip the shutter-operating mechanism. This will result in heating the wire 15. When the wire ruptures, it will spark and the separated ends will then glow, as shown in Fig. 7, in the form of two short red lines. The fuse will glow for a total period of perhaps .01 second.

The timing of the shutter-operating mechanism will be adjusted to such speed that the shutter opening will properly coincide with the fuse flash.

Ordinarily if during the instant that the shutter is open the operator sees the fuse at the time it has reached the said red-line stage, he will know that if a lamp is substituted for the fuse plug it will be at its highest point of luminosity, since ignition of the lamp will begin at the same stage at which the gap occurs in the fuse.

In other instances, as where larger bulbs with consequently larger bodies of gas to be heated are used, the time required for such bulbs to reach the peak of luminosity is slightly longer. In such instances, the operator will adjust the timing apparatus until, as viewed through the shutter, the said red dashes will be nearly faded. Where smaller and consequently faster bulbs are to be employed, he will so adjust the shutter timing that the wire when viewed through the shutter will be seen more clearly at the stage where the wire is actually being ruptured—as indicated by the presence of bright sparks.

It will be understood that if upon a first test the operator does not see the fuse wire at the proper degree of luminosity, he will loosen the clamps and draw additional fuse wire from a spool 25 which is rotatably supported on an arm carried by one of the jaws 16, as often as may be required to arrive at the proper synchronization. A jaw of each pair carries a supporting pin 26 which extends loosely through a hole in the other adjacent jaw and serves as a vertical support and alining member for the wire.

As an alternative to the operator using his judgment in determining the proper degree of luminosity of the fuse when the shutter is open during a test, provision is made for lengthening or shortening the fuse. This lengthening or shortening is effected by adjusting the jaws about their pivots 20 and 22, to change the width of the gap at the upper ends of the jaws. A shorter length of fuse between the jaws will be ruptured more quickly than a longer length. The smaller length of fuse would be employed in testing for smaller and faster bulbs. By making these adjustments, the operator will adjust the synchronizing apparatus until he sees two red glowing ends of the ruptured wire. In timing for larger and consequently slower bulbs, the fuse wire will be lengthened and here again the operator can be guided by viewing the said red fuse ends. In each instance the glowing ends will be his guide instead of his having to estimate as between stages of luminosity.

Fig. 5 shows a different form of clamp for the fuse holding jaws, said clamp consisting of a pin 27 that extends through the jaws and upon which is pivotally mounted a camming lever 28 which is oscillated to effect gripping movements of the jaws. A fuse spool may be mounted on one of the jaws of Fig. 5, as in the case of Fig. 3.

Referring now to Fig. 6, I show another form of synchronizing mechanism with which my testing device may be employed. This mechanism comprises a solenoid 30 which is supplied with current from a battery 32 which corresponds to the battery 13. An armature 33 is provided for tripping the shutter-operating mechanism, such armature being yieldably held in spaced relation to the magnet, anad being adjustable toward the magnet by a screw 34, to vary the air gap and hence the rapidity with which the armature will respond upon closure of the circuit. Movement of the armature serves to trip the shutter. The fuse plug 24 is connected across the battery 32. Upon manual closure of the switch 35, the parallel circuit will be completed through the solenoid and the fuse plug, adjustments of the screw 34 being made in order to effect properly timed relation between rupture of the fuse 15 and the tripping of the shutter.

In order to secure greater length of fuse at 15 for a desired slower rupture thereof, such greater length can be obtained by drawing sufficient fuse wire from the spool to permit of forming a bend therein between the fuse clamps, instead of adjusting the fuse clamps to provide a greater length of gap therebetween.

The plug 24 and the fuse holders associated therewith form a convenient means for testing fuse wires in order to determine the relative rupturing capacities of wires and the accuracy with which they are made, particularly in view of the fact that the plug can be screwed into ordinary lamp sockets.

I claim as my invention:

1. In a device for testing the synchronization of a camera shutter and a flash lamp, in combination with apparatus for synchronizing the movements of a camera shutter and the illumination of the flash lamp, said apparatus including a flash lamp circuit, of means for connecting a luminescent fuse wire in the flash lamp circuit, in lieu of the lamp, in position to be viewed through the shutter, and means for varying the length of the fuse.

2. In a device for testing the synchronization of a camera shutter and a flash lamp, in combination with apparatus for controlling operating mechanism of the camera shutter, of an electric circuit closable by said apparatus during initial movement thereof, means for supporting a supply of fuse wire, and means for connecting desired lengths of fuse wire from said supply, in said circuit.

THOMAS McG. AIKEN.